(12) United States Patent
Gaal et al.

(10) Patent No.: US 9,130,725 B2
(45) Date of Patent: Sep. 8, 2015

(54) INTERACTION OF PDSCH RESOURCE MAPPING, CSI-RS, AND MUTING

(75) Inventors: Peter Gaal, San Diego, CA (US); Tao Luo, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 730 days.

(21) Appl. No.: 13/287,009

(22) Filed: Nov. 1, 2011

(65) Prior Publication Data

US 2012/0113917 A1 May 10, 2012

Related U.S. Application Data

(60) Provisional application No. 61/409,486, filed on Nov. 2, 2010, provisional application No. 61/411,421, filed on Nov. 8, 2010.

(51) Int. Cl.
*H04L 5/00* (2006.01)
*H04L 5/14* (2006.01)

(52) U.S. Cl.
CPC ............ *H04L 5/0058* (2013.01); *H04L 5/1438* (2013.01); *H04L 5/0048* (2013.01)

(58) Field of Classification Search
CPC .................................................... H04L 5/0048
USPC ................................ 370/329; 455/450, 452.2
See application file for complete search history.

(56) References Cited

U.S. PATENT DOCUMENTS

| 8,005,175 | B2 | 8/2011 | Yang et al. |
| 8,073,428 | B2 | 12/2011 | Khetawat et al. |
| 8,095,143 | B2 | 1/2012 | Amirijoo et al. |
| 8,145,252 | B2 | 3/2012 | Sung et al. |
| 8,150,397 | B2 | 4/2012 | Khetawat et al. |
| 8,208,434 | B2 | 6/2012 | Sayana et al. |
| 8,305,987 | B2 * | 11/2012 | Fong et al. ................. 370/329 |
| 2007/0206623 | A1 | 9/2007 | Tiedemann, Jr. et al. |
| 2010/0069065 | A1 | 3/2010 | Sambhwani et al. |
| 2010/0120442 | A1 | 5/2010 | Zhuang et al. |
| 2010/0297936 | A1 | 11/2010 | Nan |
| 2011/0044391 | A1 | 2/2011 | Ji et al. |

(Continued)

FOREIGN PATENT DOCUMENTS

| CN | 1881867 A | 12/2006 |
| JP | 2012021018 A | 2/2012 |

(Continued)

OTHER PUBLICATIONS

Huawei et al: "Proposal for specification of PDSCH Muting", 3GPP Draft; R1-105132, 3rd Generation Partnership Project (3GPP), Mobile Competence Centre ; 650, Route Des Lucioles ; F-06921 Sophia-Antipolis Cedex ; France, vol. RAN WG1, no. Xi 'an; Oct. 11, 2010, Oct. 5, 2010, XP050450353, [retrieved on Oct. 5, 2010] Sections 1-2.

(Continued)

*Primary Examiner* — Christopher Grey
(74) *Attorney, Agent, or Firm* — Patterson & Sheridan, L.L.P.

(57) ABSTRACT

Certain aspects of the present disclosure provide techniques that may help resolve ambiguities between a base station and a user equipment (UE) regarding the use or resource elements (REs) reserved for special purposes, such as PDSCH muting and/or CSI-RS.

37 Claims, 11 Drawing Sheets

(56) References Cited

U.S. PATENT DOCUMENTS

| | | |
|---|---|---|
| 2011/0051654 A1 | 3/2011 | Blankenship et al. |
| 2011/0164550 A1 | 7/2011 | Chen et al. |
| 2011/0170435 A1 | 7/2011 | Kim et al. |
| 2011/0170496 A1 | 7/2011 | Fong et al. |
| 2012/0051277 A1 | 3/2012 | Li et al. |
| 2012/0087299 A1 | 4/2012 | Bhattad et al. |
| 2012/0113917 A1 | 5/2012 | Gaal et al. |
| 2012/0170508 A1 | 7/2012 | Sawai |
| 2012/0329400 A1 | 12/2012 | Seo et al. |
| 2013/0182583 A1 | 7/2013 | Siomina et al. |

FOREIGN PATENT DOCUMENTS

| | | |
|---|---|---|
| JP | 201352986 A | 7/2013 |
| WO | WO2011093671 A2 | 8/2011 |
| WO | WO-2011160926 A1 | 12/2011 |

OTHER PUBLICATIONS

International Search Report and Written Opinion—PCT/US2011/059003—ISA/EPO—Feb. 1, 2012.

Motorola: "Remaining Aspects and Signaling of PDSCH RE Muting", 3GPP Draft; R1-105617 Remaining Aspects of Muting and Related Signalling (Final Clean), 3rd Generation Partnership Project (3GPP), Mobile Competence Centre ; 650, Route Des Lucioles ; F-06921 Sophia-antipolis Cedex ; France, vol. RAN WG1, no. Xis an, China; 201010, Oct. 14, 2010, XP050489317, [retrieved on Oct. 14, 2010] section 3.

Texas Instruments: "Signaling for PDSCH Muting in Rel-10", 3GPP Draft; R1-105283 TI Signaling for PDSCH Muting, 3rd Generation Partnership Project (3GPP), Mobile Competence Centre ; 650, Route Des Lucioles ; F-06921 Sophia-Antipolis Cedex ; France, vol. RAN WG1, no. Xi 'an; Oct. 11, 2010, Oct. 5, 2010, XP050450455, [retrieved on Oct. 5, 2010] section 2.

Texas Instruments: "PDSCH Muting Considerations on CSI-RS for Rel-10 LTE", 3GPP Draft; R1-104470 TI Muting Considerations for CSI-RS, 3rd Generation Partnership Project (3GPP), Mobile Competence Centre ; 650, Route Des Lucioles ; F-06921 Sophia-Antipolis Cedex ; France, vol. RAN WG1, no. Madrid, Spain; Aug. 23, 2010, Aug. 17, 2010, XP050449796, [retrieved on Aug. 17, 2010] sections 1 & 3.1.

ZTE: "Radio link monitoring in non-CA based heterogeneous deployments", 3GPP Draft; R1-105465, 3rd Generation Partnership Project (3GPP), Mobile Competence Centre ; 650, Route Des Lucioles ; F-06921 Sophia-Antipolis Cedex . ; France, vol. RAN WG1, no. Xi 'An; Oct. 11, 2010, Oct. 5, 2010, XP050450587, [retrieved on Oct. 5, 2010] section 3.

3rd Generation Partnership Project; Technical Specification Group Radio Access Network; Evolved Universal Terrestrial Radio Access (E-UTRA); Physical layer for relaying operation (Release 10), 3GPP Standard; 3GPP TS 36.216, 3rd Generation, Partnership Project (3GPP), Mobile Competence Centre, 650, Route Des Lucioles, F-06921 Sophia-Antipolis Cedex, France, no. V1.0.0, Sep. 22, 2010 , pp. 1-12, XP050442197, [retrieved on Sep. 22, 2010].

Huawei et al., "Remaining issues on CSI RS signalling" , 3GPP Draft; R1-105131, 3rd Generation Partnership Project (3GPP), Mobile Competence Centre, 650, Route Des Lucioles, F-06921 Soph IA-Anti POL1 S Cedex, France, vol. RAN WG1, no. X i 'an; Oct. 11, 2010, Oct. 5, 2010, XP050450352, [retrieved on Oct. 5, 2010].

NEC Group: "Remaining issues of the R-PDCCH interleaving for Type 1 Relay nodes", 3GPP DRAFT, R1-105420, 3rd Generation Partnership Project (3GPP), Mobile Competence Centre, 650, Route Des Lucioles, F-06921 Sophia-Anti Polis Cedex, France, vol. RAN WG1, no. X i 'an, Oct. 11, 2010, Oct. 5, 2010, XP050450557, [retrieved on Oct. 5, 2010].

New Postcom: "Downlink CSI-RS signaling design for LTE-Advanced", 3GPP Draft; R1-105035, 3rd Generation Partnership Project (3GPP), Mobile Competence Centre, 650, Route Des Lucioles, F-06921 Sophia-Anti Polis Cedex, France, vol . RAN WG1, no. Madrid, Spain, Aug. 23, 2010, Aug. 27, 2010, XP050450287, [retrieved on Aug. 27, 2010].

Qualcomm Incorporated: "Finalizing Signaling and Configuration of CSI-RS", 3GPP Draft; R1-105565 Finalizing Signaling and Configuration of CSI-RS, 3rd Generation Partnership Project (3GPP), Mobile Competence Centre ; 650, Route Des Lucioles ; F-06921 Sophia-Antipolis Cedex ; France, vol. RAN WGI, no. Xian; Oct. 11, 2010, Oct. 5, 2010, XP050450663, [retrieved on Oct. 5, 2010].

Yuan, Y., Wu, S., Yang, J. et al., (2010), Relay Backhaul Subframe Allocationin LTE-Advanced for TDD. Proceedings from ICST '10 Conference on Communications and Networking in China (Chinacom), pp. 1-5, http://ieeexplore.ieee.org/stamp/stamp.jsp?tp=&arnumber=5684779.

Bonneville, H., Brueck, S., Farber, M. et al. (Feb. 2011). Advanced Relay Technical Proposals, Artist4G, Seventh Framework Programm, pp. 1-161, Sections 2.1.5 & 6.2.1., https://ict-artist4g.eu/projet/work-packages/wp3/internal-reports-deliverables/d3.2/d3.2-v-2.0-pdf-version/d3.2-v-2.0.

Alcatel-Lucent, Alcatel-Lucent Shanghai Bell, "Physical Layer Procedure for muting for CSI-RS for inter-cell measurements for Rel-10 UEs", [online], 3GPP TSG RAN WG1 Meeting #62, R1-104394, http://www.3gpp.org/ftp/tsg_ran/WG1_RL1/TSGR1_62/Docs/R1-104394.zip, pp. 1-3.

Ericsson, St-Ericsson, "Further views on Muting", [online], 3GPP TSG-RAN WG1 #62bis, Oct. 11, 2010, R1-105323, URL: http://www.3gpp.org/ftp/tsg_ran/wg1_rl1/TSGR1_62b/Docs/R1-105323.zip, pp. 1-3.

New Postcom., "Design of PDSCH muting for CSI-RS in LTE-Advanced", [online],3GPP TSG RAN WG1 Meeting #62bis, Xi'an, China, Oct. 11-15, 2010, R1-105223, URL: http://www.3gpp.org/ftp/tsg_ran/wg1_rl1/TSGR1_62b/Docs/R1-105223.zip, pp. 1-5.

Nokia Siemens Networks, Nokia, "PDSCH RE muting for CSI-RS", [online], 3GPP TSG-RAN WG1 Meeting #62bis, Oct. 11, 2010, R1-105529, URL: http://www.3gpp.org/ftp/tsg_ran/wg1_rl1/TSGR1_62b/Docs/R1-105529.zip, pp. 1-6.

NTT Docomo, "DL RS RAN1 Chairman's Notes", [online], 3GPP TSG RAN WG1 Meeting #62 bis, R1-105803, URL: http://www.3gpp.org/ftp/tsg_ran/wg1_rl1/TSGR1_62b/Docs/R1-105803.zip, pp. 1-4.

Ohwatari Y., et al., "Investigation on Improvement of Channel Estimation Accuracy with Data Signal Muting for Downlink Coordinated Multiple-Point Transmission and Reception in LTE-Advanced", IEICE Technical Report, vol. 110, No. 251, Oct. 27, 2010, pp. 1-7.

Texas Instruments , "Signaling for PDSCH Muting in Rel-10", [online], 3GPP TSG RAN WG1 #62bis, Oct. 11, 2010, R1-105283, Retreived from the Internet: http://www.3gpp.org/ftp/tsg_ran/wg1_rl1/TSGR1_62b/Docs/R1-105283.zip, pp. 1-7.

Www.3gpp.org -/ftp/tsg_ran/wg1_rl1/TSGR1_62b/Docs/[online], [Apr. 22, 2014], Internet: URL, http://www.3gpp.org/ftp/tsg_ran/wg1_rl1/TSGR1_62b/Docs/.

Www.3gpp.org-/ftp/tsg_ran/WG1_RL1/TSGR1_62/Docs/ , [online] Apr. 22, 2014, Internet URL: http://www.3gpp.org/ftp/tsg_ran/WG1_RL1/TSGR1_62/Docs/.

* cited by examiner

INTERACTION OF PDSCH RESOURCE MAPPING, CSI-RS, AND MUTING

CLAIM OF PRIORITY UNDER 35 U.S.C. §119

The present application for patent claims priority to U.S. Provisional Application No. 61/409,486, entitled, "INTERACTION OF PDSCH RESOURCE MAPPING AND CSI-RS IN LTE-A" filed Nov. 2, 2010, and U.S. Provisional Application No. 61/411,421, entitled, "INTERACTION OF PDSCH RESOURCE MAPPING AND CSI-RS IN LTE-A" filed Nov. 8, 2010, both assigned to the assignee hereof and hereby expressly incorporated by reference herein.

BACKGROUND

1. Field

The present disclosure relates generally to communication systems, and more particularly, to a technique for blindly decoding interfering cell Physical Downlink Control Channel (PDCCH) to acquire interfering cell Physical Downlink Shared Channel (PDSCH) transmission information.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communication. The method generally includes determining, by a base station, a period of ambiguity wherein the base station lacks certainty regarding the capability of a user equipment (UE) to support a configuration of resources reserved for a special purpose and excluding the resources reserved for a special purpose when performing rate matching when transmitting a physical downlink shared channel (PDSCH) to the UE in the resource block during the period of ambiguity.

Certain aspects of the present disclosure provide a method for wireless communication. The method generally includes determining, by a user equipment (UE), a period of ambiguity wherein the base station lacks certainty regarding a capability of the UE to support a configuration of resources reserved for a special purpose in a subframe and processing the subframe with an assumption that the base station has excluded the resources reserved for a special purpose when performing rate matching when transmitting a physical downlink shared channel (PDSCH) to the UE in the subframe during the period of ambiguity.

Certain aspects of the present disclosure provide an apparatus for wireless communication. The apparatus generally includes means for determining, by a base station, a period of ambiguity wherein the base station lacks certainty regarding a capability of a user equipment (UE) to support a configuration of resources reserved for a special purpose in a subframe and means for excluding the resources reserved for a special purpose when performing rate matching when transmitting a physical downlink shared channel (PDSCH) to the UE in the subframe during the period of ambiguity.

Certain aspects of the present disclosure provide an apparatus for wireless communication. The apparatus generally includes means for determining, by a user equipment (UE), a period of ambiguity wherein the base station lacks certainty regarding a capability of the UE to support a configuration of resources reserved for a special purpose in a subframe and means for processing the subframe with an assumption that the base station has excluded the resources reserved for a special purpose when performing rate matching when transmitting a physical downlink shared channel (PDSCH) to the UE in the subframe during the period of ambiguity.

Certain aspects of the present disclosure provide an apparatus for wireless communication. The apparatus generally includes at least one processor configured to determine, by a base station, a period of ambiguity wherein the base station lacks certainty regarding a capability of a user equipment (UE) to support a configuration of resources reserved for a special purpose in a subframe and exclude the resources reserved for a special purpose when performing rate matching when transmitting a physical downlink shared channel (PDSCH) to the UE in the subframe during the period of ambiguity; and a memory coupled with the at least one processor.

Certain aspects of the present disclosure provide an apparatus for wireless communication. The apparatus generally includes at least one processor configured to determining, by a user equipment (UE), a period of ambiguity wherein the base station lacks certainty regarding a capability of the UE to support a configuration of resources reserved for a special purpose in a subframe and process the subframe with an assumption that the base station has excluded the resources reserved for a special purpose when performing rate matching when transmitting a physical downlink shared channel (PDSCH) to the UE in the subframe during the period of ambiguity; and a memory coupled with the at least one processor.

Certain aspects of the present disclosure provide a computer program product comprising a computer-readable medium having instructions stored thereon. The instructions are generally executable by one or more processors for determining, by a base station, a period of ambiguity wherein the base station lacks certainty regarding a capability of a user equipment (UE) to support a configuration of resources reserved for a special purpose in a subframe and excluding the resources reserved for a special purpose when performing rate matching when transmitting a physical downlink shared channel (PDSCH) to the UE in the subframe during the period of ambiguity.

Certain aspects of the present disclosure provide a computer program product comprising a computer-readable medium having instructions stored thereon. The instructions are generally executable by one or more processors for determining, by a user equipment (UE), a period of ambiguity wherein the base station lacks certainty regarding a capability of the UE to support a configuration of resources reserved for a special purpose in a subframe and processing the subframe with an assumption that the base station has excluded the resources reserved for a special purpose when performing rate matching when transmitting a physical downlink shared channel (PDSCH) to the UE in the subframe during the period of ambiguity

DETAILED DESCRIPTION

Figure 1:
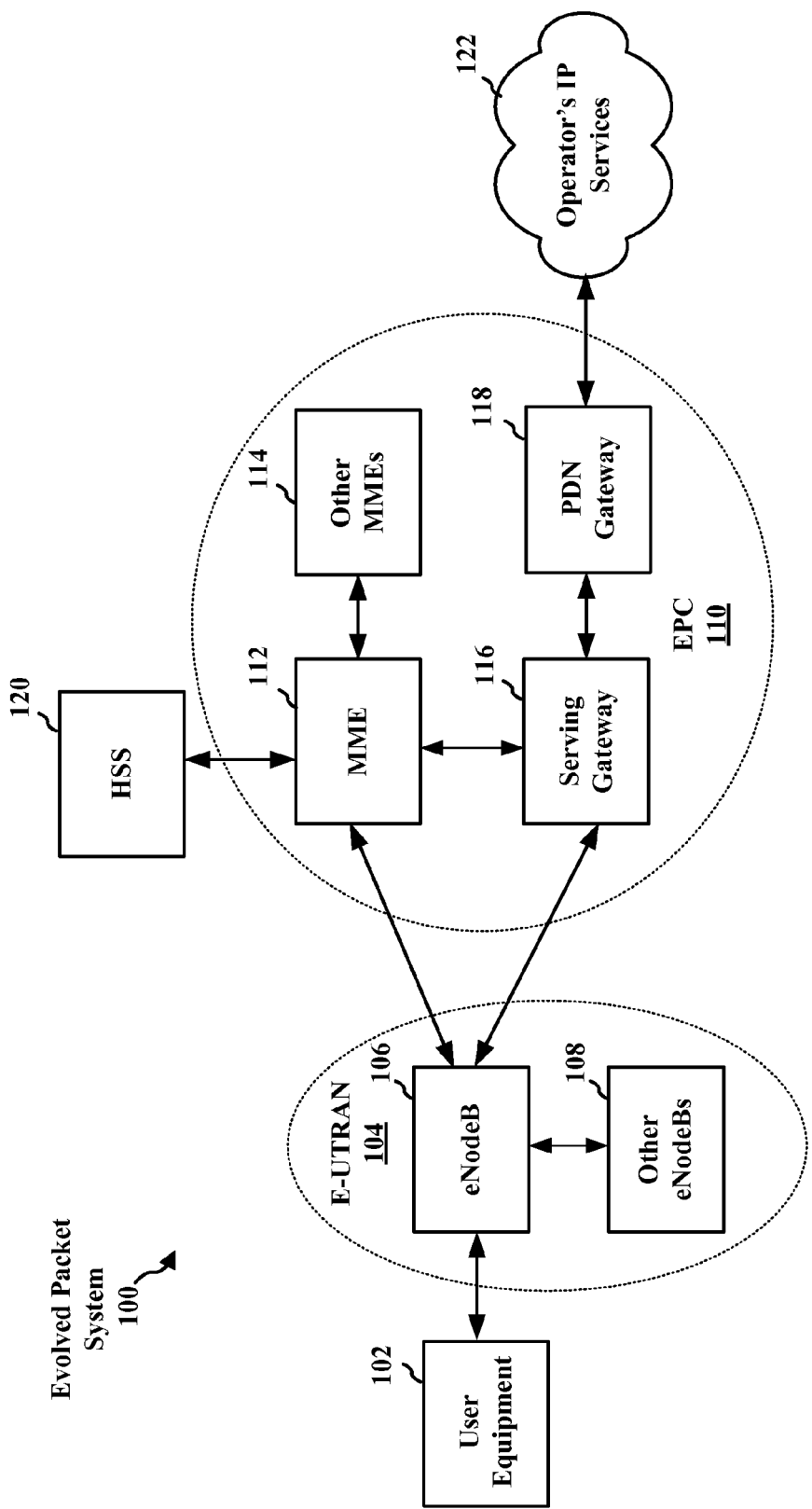
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
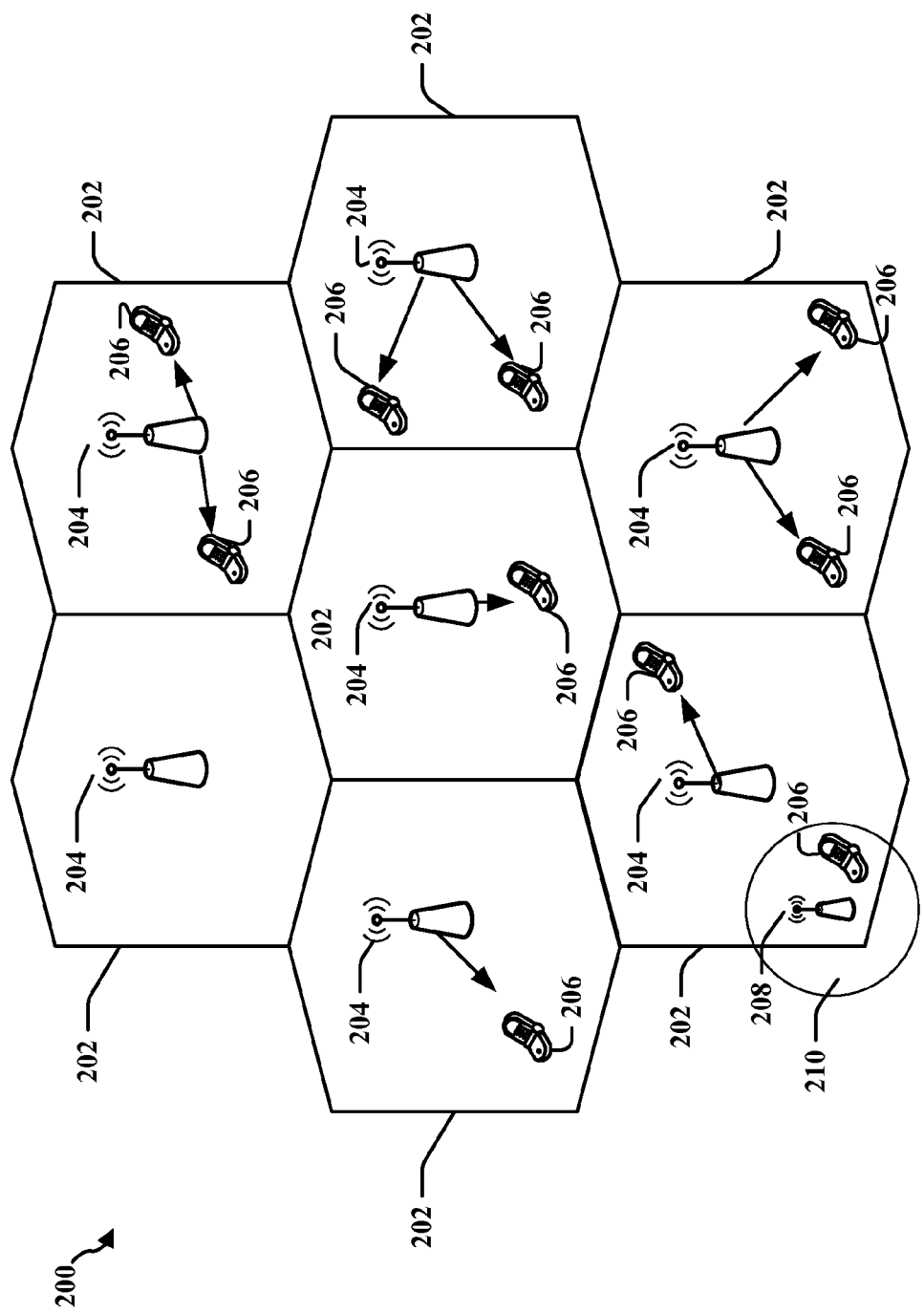
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
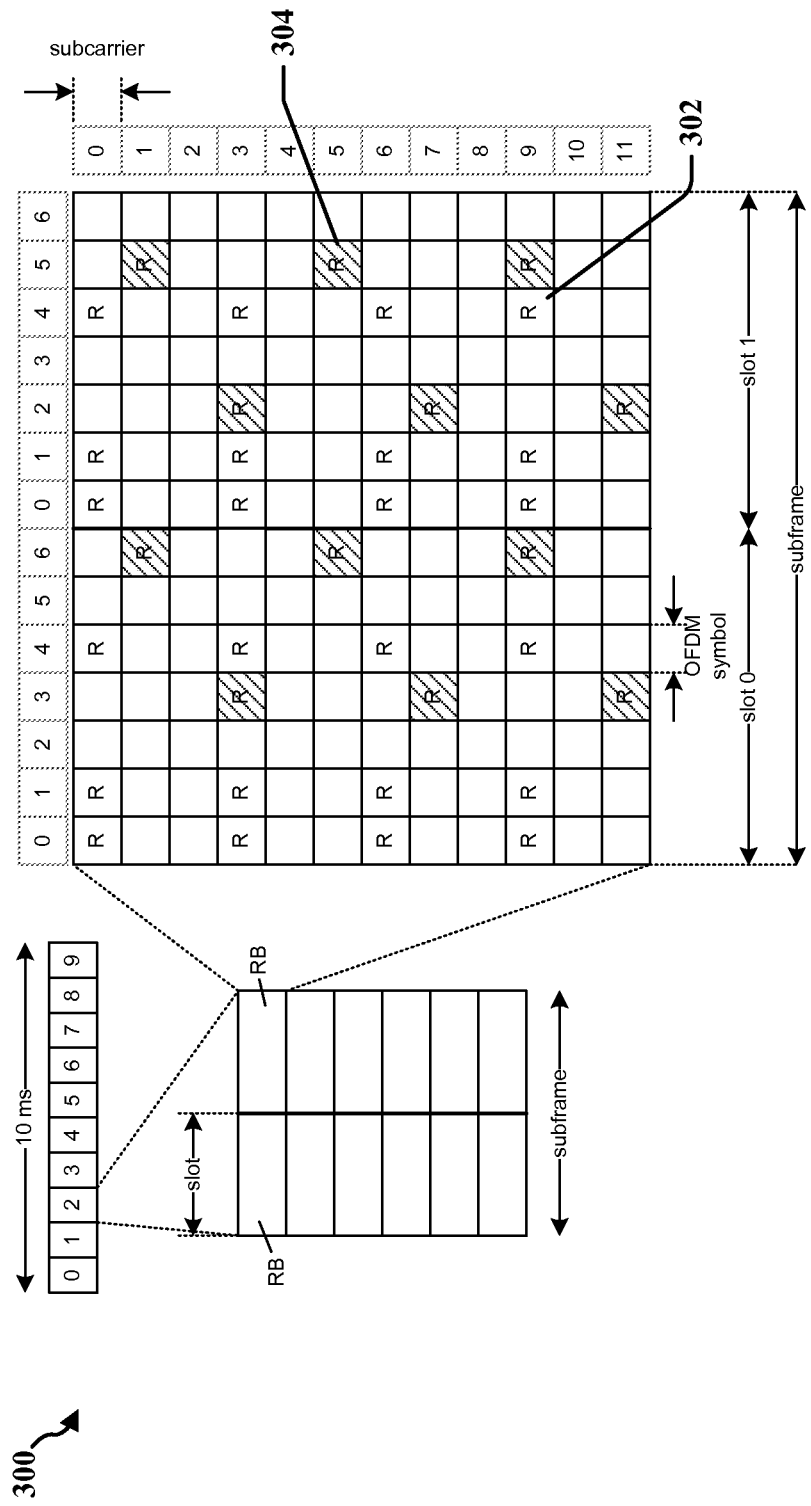
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
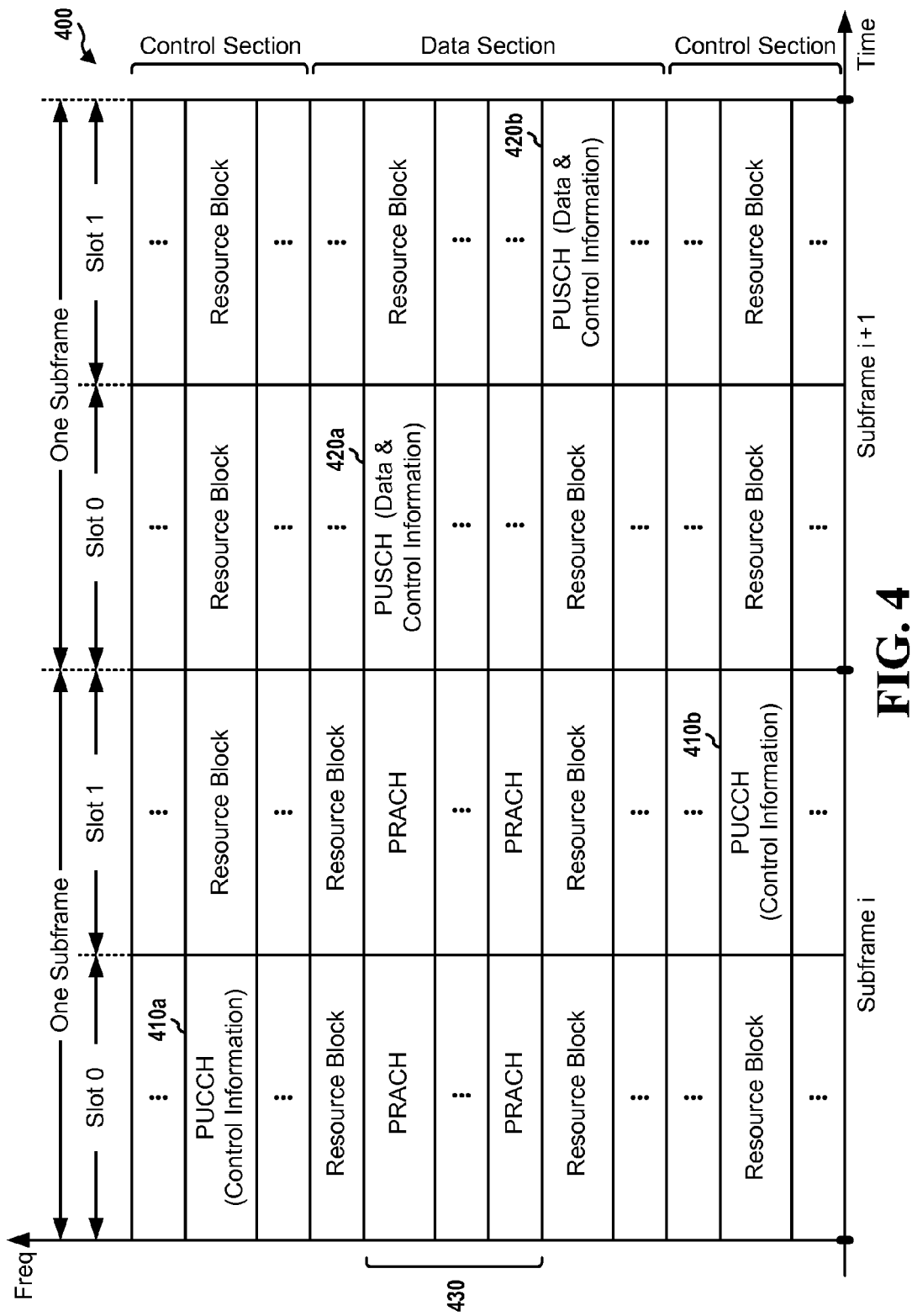
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
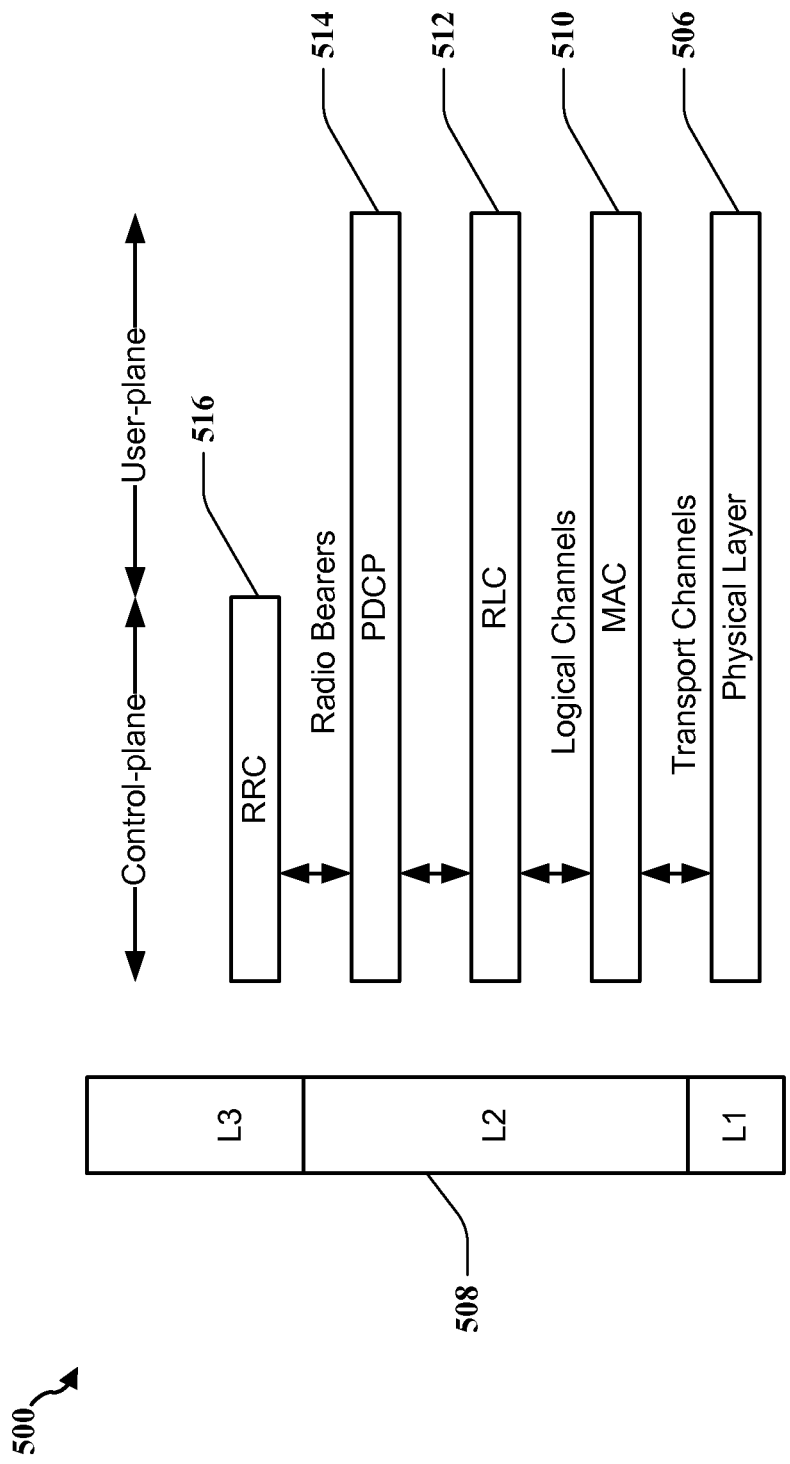
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
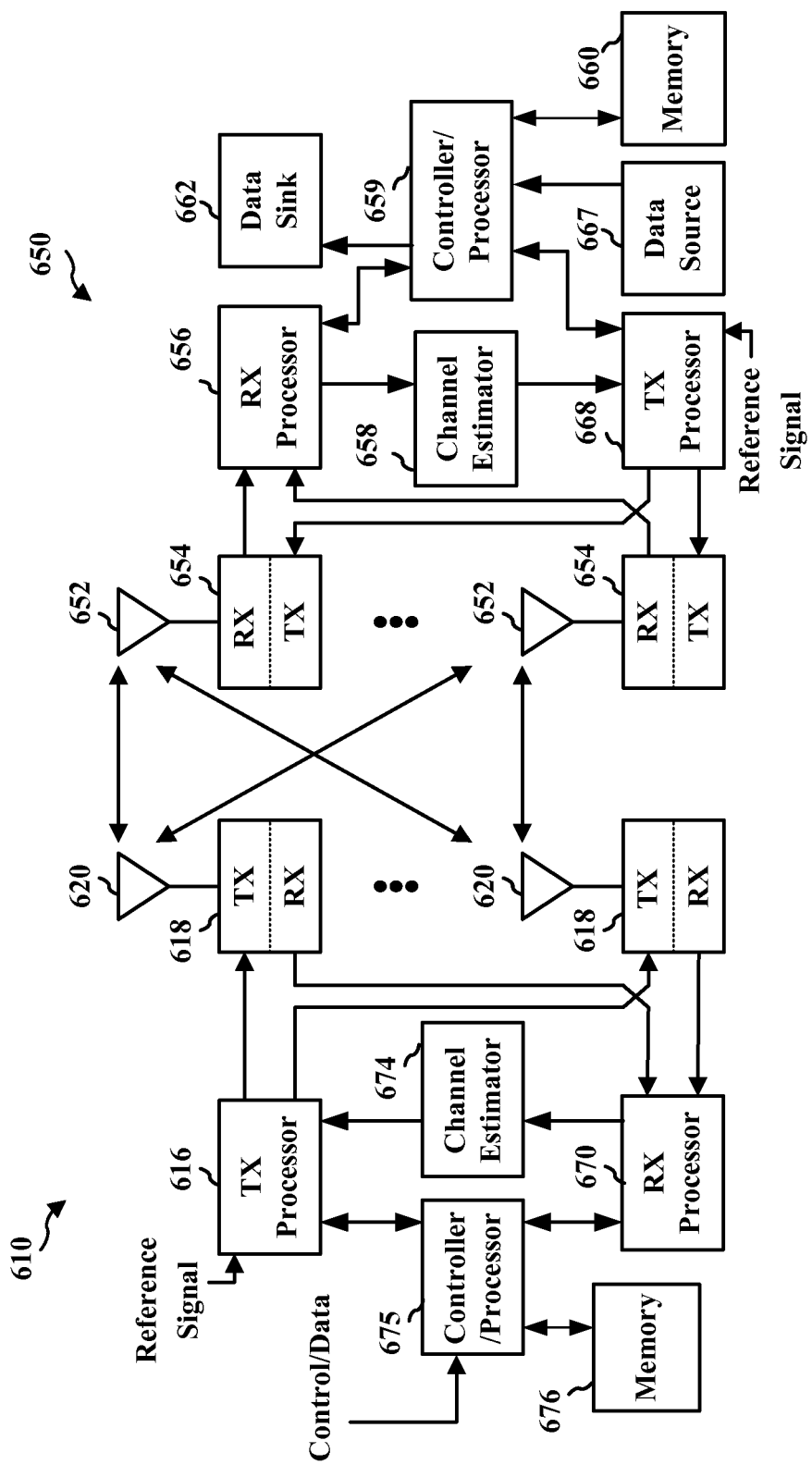
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Certain aspects of the present disclosure provide techniques that may help resolving ambiguity between a base station and a user equipment (UE), regarding the UEs capability to process resources reserved for special purposes. An example of this ambiguity is when a base station is not certain whether or not a UE is capable of properly processing a subframe with REs used for CSI-RS or REs in which PDSCH muting is performed.

In LTE Rel-8/9/10, data transmissions via PDSCH may be either dynamically scheduled or semi-persistently scheduled. PDCCH may be used to dynamically schedule PDSCH or to activate/deactivate semi-persistent PDSCH transmissions. Each UE 120 may be semi-statically configured to operate in a downlink (DL) transmission (TX) mode. Under each DL TX mode, a UE 120 may need to monitor two distinct downlink control information (DCI) sizes coming from two or more DCI formats, depending on whether the DCI is located in the common search space or the UE-specific search space.

For example, in the common search space, DCI formats 1A/0/3/3A (which have the same size) and 1C may be received. Furthermore, in the common search space, up to 6 PDCCH decoding candidates may need to be processed (4 with aggregation level 4 and 2 with aggregation level 8). In general, aggregation level N has N control channel elements (CCEs), each CCE has 36 resource elements (REs), and each RE is a one frequency-time unit.

In the UE-specific search space, DCI formats 1A/0 (which have the same size) and another DL TX mode-dependent format (e.g., 1, 1B, 1D, 2A, 2B, 2C, etc.) may be received. In the UE-specific search space, up to 16 PDCCH decoding candidates may need to be processed (6 with aggregation level 1, 6 with aggregation level 2, 2 with aggregation level 4, and 2 with aggregation level 8).

Broadcast transmissions (e.g., system information, paging, RACH response, group power control, etc.) may always utilize PDCCHs in the common search space. UE-specific transmissions may utilize PDCCHs in the UE-specific search space and the common search space (e.g., if DCI format 1A/0 is used).

One purpose of having DCI format 1A in all the DL transmission modes is for what is referred to as "fallback operation." As used herein, the term fallback operation generally refers to the need for the eNB to have a way to communicate with UE regardless of the operational state of the wireless network. For instance, various periods of ambiguity may occur in the wireless network, where an eNB and UE are not in synch, regarding the capability and/or configuration of the UE.

As an example, during RRC (layer 3) re-configuration of a UE from one DL transmission mode to another mode, there may exist a period during which the eNB may not be sure about whether a given UE is still with the old mode or has switched to the new mode. If there is a need for the eNB to transmit DL data to the UE during this period of operational ambiguity, DCI format 1A and its associated DL transmission schemes, e.g., transmit diversity, can be used. As a result, the communication between the eNB and the UE can be performed without any interruption.

Another example of operational ambiguity may occur when an antenna port to RE's allocated to reference signal transmission may change. When the mapping is changed, during certain period, the numbers of muted REs, as understood by the eNB and a UE, may be different. In some designs, the operational ambiguity may exist for around 5 to 10 subframes (milliseconds).

The mode-dependent DCI format (1, 1B, 1D, 2, 2A, 2B, 2C, etc) is often associated with a particular PDSCH transmission scheme (e.g., CRS based open loop spatial multiplexing, CRS based closed loop spatial multiplexing, DM-RS based spatial multiplexing, rank 1 beamforming, etc.).

Example PDSCH Resource Mapping

Figure 7:
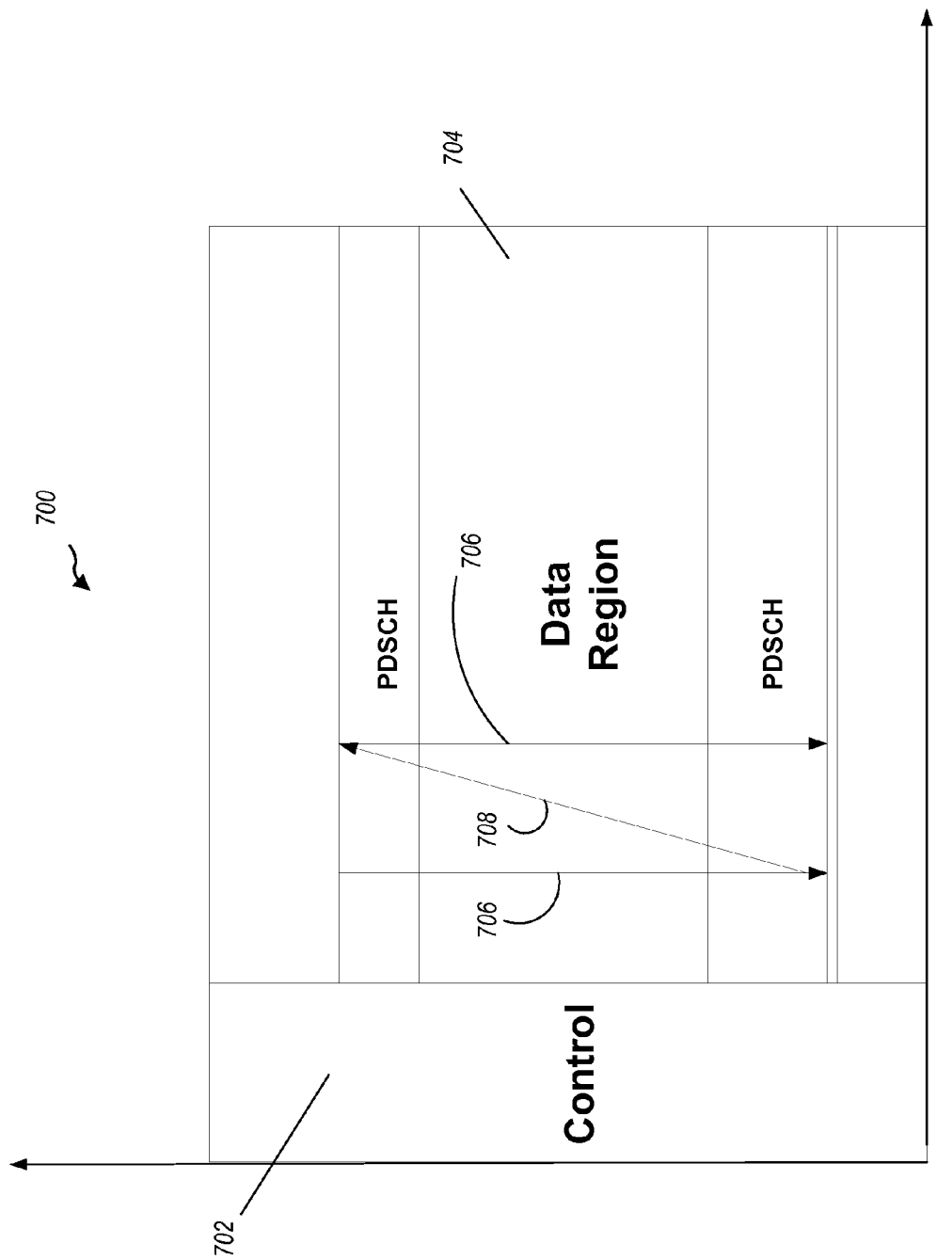
FIG. 7 illustrates an example of resource mapping, in accordance with certain aspects of the disclosure.

In Rel-8/9/10, PDSCH resource mapping is conventionally performed in frequency first, followed by time, as illustrated in the example resource map 700 of FIG. 7. The resource map 700 illustrates a sequence of assigning PDSCH resources. In the depicted resource map 700, region 702 represents resource elements allocated to control messages and region 704 represents resource elements allocated to data transmission. PDSCH is first assigned resources in the same time slot, from a lowest frequency to a highest frequency (line 706), followed by a next time slot (line 708) in which resources are once again assigned starting from the lowest available frequency to the highest available frequency.

In LTE-A, the number of supported antenna configured is increased, relative to previous LTE releases, from up to 4×4 to 8×8, which presents challenges regarding RS overhead with 8Tx antennas. The adopted solution is to decouple RS for channel feedback and RS for demodulation, namely, CSI-RS (Channel State Information Reference Signal) for channel feedback and DM-RS for demodulation.

CSI-RS, similar to CRS, is also a reference signal shared by the UEs in the same cell. CSI-RS is not precoded, is sparse in frequency and time, and is unrelated to CRS antenna ports. CSI-RS has the following characteristics: CSI-RS density is 1 RE per port per PRB, the values for the number of CSI-RS ports are 1, 2, 4 and 8, the number of CSI-RS ports is signaled by 2 bits, the CSI-RS configuration is cell-specific and signaled via higher-layer by 5 bits, and CSI-RS are not present in the cell if they are not configured.

A Rel-10 UE may assume PDSCH rate matching around the CSI-RS REs (e.g., after UE capability, i.e. its release, is known by the eNB) for all unicast PDSCH transmissions in any transmission mode.

In order to be future compatible, particularly for CoMP (cooperative multipoint transmissions) operation, PDSCH muting was agreed to be supported in LTE Rel-10. PDSCH muting configuration may be UE-specific and signaled via higher-layer, and is performed over a bandwidth that follows the same rule as the CSI-RS. The intra-subframe location of muted resource elements is indicated by a 16-bit bitmap, where each bit corresponds to a 4-port CSI-RS configuration, all REs used in a 4-port CSI-RS configuration set to 1 are muted (zero power assumed at UE), except for the CSI-RS REs if they belong to this CSI-RS configuration, and this signaling is common for FDD and TDD CSI-RS configurations.

When muting of PDSCH REs is configured, a Rel-10 UE may assume PDSCH rate matching around the muted REs (after UE capability, i.e. its release, is known by the eNB 110) for all unicast PDSCH transmissions in any transmission mode. However, a "legacy" UE (e.g., Rel-9 or earlier) may not support muting and/or CSI-RS. Thus, a period of ambiguity may exist when the base station lacks information regarding a release version of a standard the UE supports.

A single value of subframe offset and duty cycle may be signaled for all the muted resource elements, using the same encoding as for the subframe offset and duty cycle of the CSI-RS. In some designs, muted REs may not be located in subframes without CSI-RS. In other designs, muted REs can be located in subframes without CSI-RS, and in this case the CSI-RS duty cycle is an integer multiple of the muted REs duty cycle.

Example Interaction Of PDSCH Resource Mapping, CSI-RS, and Muting

Figure 8:
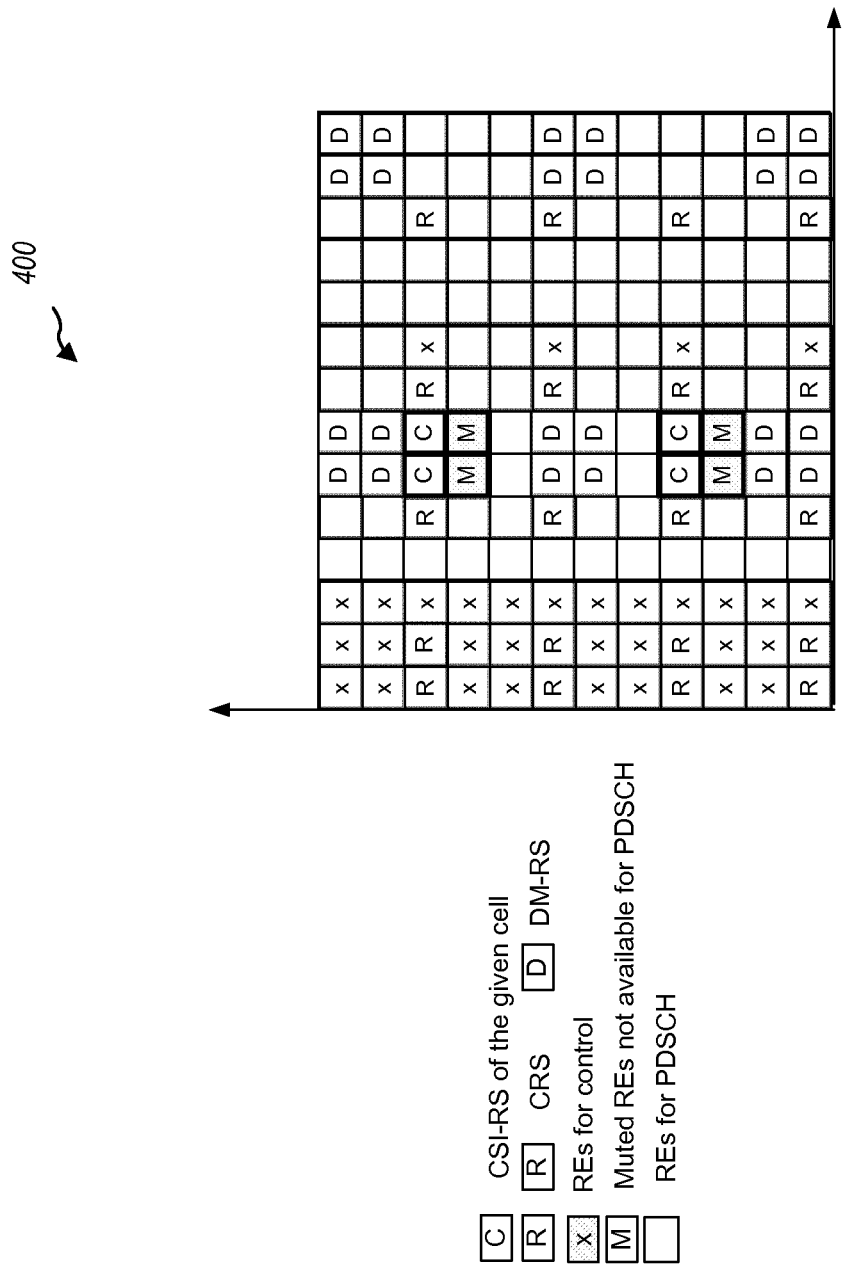
FIG. 8 illustrates an example resource map with CSI-RS and muting, in accordance with certain aspects of the disclosure.

FIG. 8 illustrates an example resource map 800 illustrating a possible rate matching scenario within a RB when PDSCH muting is configured. A UE may be signaled of a configuration that identifies resource elements (REs) reserved for special purposes, such as reference signals used to take measurements for channel feedback (e.g., CSI-RS) and/or PDSCH muting.

In the example illustrated in FIG. 8, the given cell has 8 REs reserved for special purposes. In particular, the map 800 has 4 CSI-RS ports occupying 4 REs (labeled "C") which are not available for PDSCH and 4 additional REs (marked "M") that may also not be available for PDSCH. These 4 additionally muted REs may provide protection of CSI-RS REs of neighboring cells and, consequently, may facilitate DL CoMP operation.

When performing PDSCH RE mapping, it may be desirable that these 8 REs used for CSI-RS and muting not be mapped (i.e., rate matching may be performed around these 8 REs). However, for legacy UEs (meaning UEs not capable of processing CSI-RS or muting) or for UEs not aware of such muting operation, these 4 muting REs should be part of the PDSCH RE mapping operation.

This, however, presents a potential period of ambiguity, for example, when a UE is exchanging messages with an eNB while attempting to access the network. In some designs, a unicast PDSCH transmission sent before a UE conveys its release information to the eNB, may not exclude the REs signaled by the eNB for PDSCH muting operation. For example, message 4 (Msg4) is an example message, more commonly referred as contention resolution message from eNB to UE.

When a UE attempts to access a LTE eNB using physical random access channel (PRACH), there are typically 4 messages exchanged between the eNB and the UE. Message 4 is the last message during the access procedure, which is sent from eNB to the UE. Since the eNB 110 is not expected to know the release of the UE 120 (e.g., Rel-8 or Rel-10) at message 4, in some designs, no PDSCH muting operation may be performed for message 4 even if the eNB broadcasts the support of PDSCH muting operation. Otherwise, message 4 may not be correctly received by the UE.

Therefore, according to certain aspects of the present disclosure, for message 4, PDSCH muting operation may not be performed for message 4. That is, PDSCH rate matching for message 4 may not exclude the REs signaled by the eNB for PDSCH muting operation. Note that eNB may choose to mute or not to mute these REs signaled for PDSCH muting operation, but PDSCH rate matching for message 4 may always include these REs.

This period of ambiguity may not exist for a UE in connected mode. For example, for UE in a connected mode, there is downlink data arrival, which triggers RACH procedure at UE. In such case, UE includes its MAC-ID in message 3 (Msg3). In this case, eNB uses MAC-ID information to identify release information of UE such that eNB can determine whether to perform rate-matching around those muting tones or not when sending PDSCH to this UE.

Note that when UE tries to decode unicast PDSCH, it typically relies on its release information (rel-10 UE vs. rel-8/9 UE) and the eNB release information to determine whether to assume PDSCH has rate-matching around muting tones or not. The eNB release information is indicated by whether muting is supported or not in System information sent by eNB.

During handover, a target eNB may convey such information to a source eNB and the source eNB, in turn, may convey such information to UE in a handover message.

A period of ambiguity may also occur when there is any re-configuration of CSI-RS ports and/or re-configuration of the PDSCH muting operation. In this case, there may exist certain ambiguity duration during which the eNB and the UEs in the cell may not be aligned, regarding the actual CSI-RS ports and/or PDSCH muting operation in use.

During this period of ambiguity, it is possible that the UE may perform blind detection according to different hypotheses. For example, it may be assumed that PDSCH rate matching is performed based on a prior configuration (before re-configuration). As an alternative, PDSCH rate matching may be based on the new configuration. In some cases, however, such blind detection may be less than optimal, due to the associated processing overhead.

In some cases, an eNB may choose to transmit to the UEs during the ambiguity period only in subframes without CSI-RS and PDSCH muting. However, such limitation may be severe, especially in heterogeneous networks, where some UEs may only monitor a limited set of subframes. In addition, since CSI-RS/muting configurations may be broadcast, a large number of UEs may be impacted simultaneously.

Certain aspects of the present disclosure may help maintain a non-interrupted link between the eNB and the UEs, regardless of the configuration of the CSI-RS and/or PDSCH muting operation.

Figure 9:
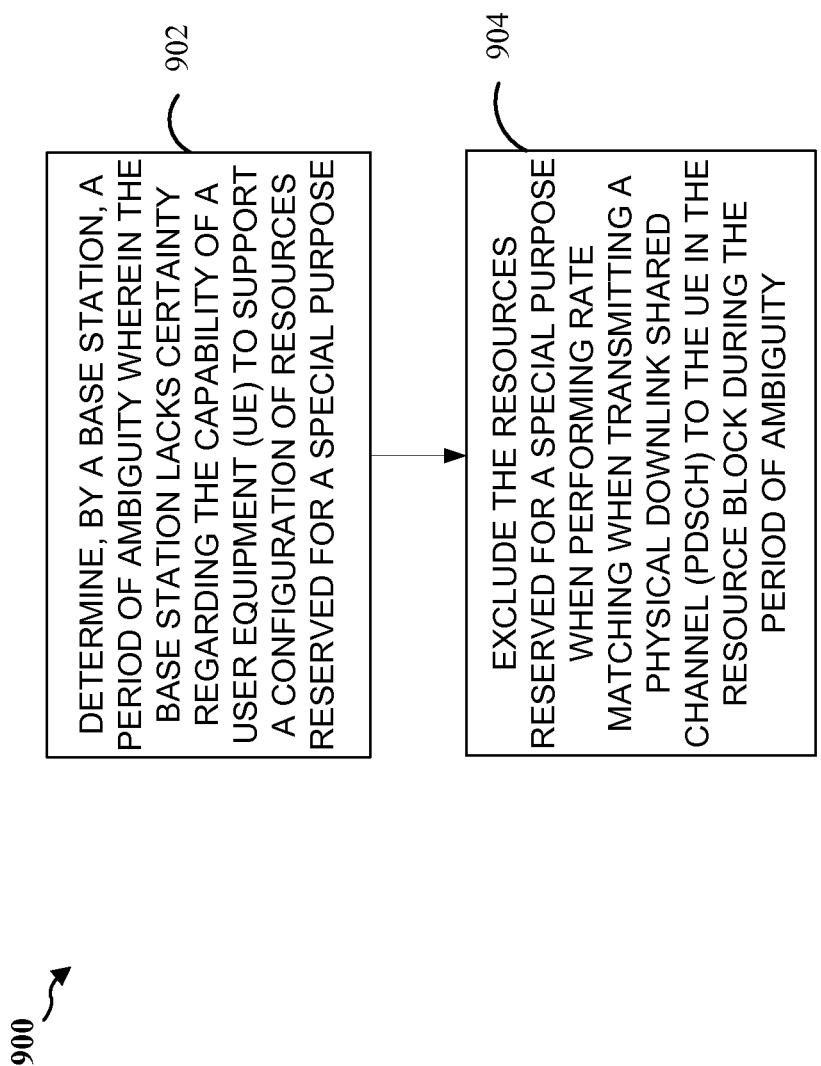
FIG. 9 illustrates example operations, in accordance with certain aspects of the disclosure.

FIG. 9 illustrates example operations 900 that an eNB may perform to help maintain a non-interrupted link between the eNB and the UEs, even in periods of ambiguity. As illustrated, when an eNB determines a period of ambiguity wherein the base station lacks certainty regarding the capability of a user equipment (UE) to support a configuration of resources reserved for a special purpose, at 902, the eNB may exclude the resources reserved for a special purpose when performing rate matching when transmitting a physical downlink shared channel (PDSCH) to the UE in the resource block during the period of ambiguity, at 904.

According to certain aspects, a "non-legacy" UE may perform complementary operations to those shown in FIG. 9. For example, during a period of ambiguity wherein the base station lacks certainty regarding a capability of the UE to support a configuration of resources reserved for a special purpose in a subframe, the UE may process the subframe with the assumption that the base station has excluded the resources reserved for a special purpose when performing rate matching when transmitting a physical downlink shared channel (PDSCH).

In certain scenarios, whether or not REs used for special purposes are excluded from rate matching may depend on whether one or more particular conditions are met during a period of ambiguity. For example, in some cases, for PDSCH transmissions, when DCI format 1A is used to schedule PDSCH transmissions, the corresponding PDSCH rate matching may not exclude REs reserved for special purposes (e.g., REs reserved for CSI-RS and/or REs reserved for muting).

This may imply that if a UE is configured with a certain downlink transmission mode, the PDSCH rate matching operations for transmissions scheduled via DCI format 1A and the ones scheduled via the mode-dependent DCI format (1, 1B, 1D, 2, 2A, 2B, 2C, etc.) may be performed differently.

For example, with DCI format 1A, PDSCH rate matching may not discount CSI-RS REs and/or the signaled muted REs. Otherwise, PDSCH rate matching may discount CSI-RS REs and/or the signaled muted REs.

Since the fallback operation may expected to occur frequently, the rules described above may be refined by introducing additional conditions. For example, in some cases, whether REs used for special purposes are excluded from rate matching may be dependent on DCI format.

As an example, with DCI format 1A in a common search space, then PDSCH rate matching may not discount CSI-RS REs and/or the signaled muted REs. On the other hand, if message format 1A in a UE-specific search space, then PDSCH rate matching may discount CSI-RS REs and/or the signaled muted REs For mode-dependent DCI formats, PDSCH rate matching may discount CSI-RS REs and/or the signaled muted REs.

Further refinements may also be necessary, based on search space characteristics. For example, in some cases, such refinements may be necessary (or at least desirable) when the common search space overlaps the UE-specific search space. This is particular true when the control region is relatively small and may create another period of ambiguity.

For example, if a UE receives a unicast PDSCH with a PDCCH format 1A using a PDCCH decoding candidate from the overlapped search space, a UE may lack clarity regarding whether the PDSCH is scheduled from the common search space or the UE-specific search space, and consequently, may lack clarity regarding whether it should apply rate-matching by discounting CSI-REs and/or the signaled muted REs or not.

One possible approach to resolve this ambiguity would be to allow only the transmission from the common search space is allowed or to allow only the transmission from the UE-specific search space.

In some cases, it may be preferable to allow the transmission from the common search space. By doing so, whenever the UE receives a unicast PDSCH with a PDCCH format 1A using the overlapped search space, the UE may assume that it comes from the common search space, and the CSI-REs and/or the signaled muted REs may not be discounted from PDSCH rate matching. From the eNB side, the eNB may take measures to ensure the same operation under such conditions.

The present disclosure addresses issues that may arise in the interaction of CSI-RS and PDSCH muting operation with regard to PDSCH resource mapping. In particular, some issues may arise with message 4 (MSG4) transmissions and fallback operation during re-configurations, and certain aspects of the present disclosure may help resolve such issues.

It will be appreciated that certain aspects of the present disclosure provide techniques for detecting ambiguity conditions, and operating when an ambiguity condition is detected. In some designs, CSI-RS are selectively discounted during rate matching operation, based on the knowledge of the version number of a UE.

It will also be appreciated that a fallback operation is disclosed. Using the fallback operation, the eNB is able to maintain communication with a UE, by communicating using predetermined message format, regardless of the version number of the UE. In some designs, only puncturing of REs is performed, without performing rate matching around the punctured REs.

It will also be appreciated that the techniques presented herein may be especially useful during the operation of a wireless network, when the REs allocated to CSI-RS change due to a change in the antenna port to RE mapping (e.g., antenna port number changes). During this time, an ambiguity may exist about how many REs to mute (e.g., to avoid interference with CSI-RS transmissions of a neighboring cell).

In some cases, an eNB may perform muting on the resource elements reserved for a PDSCH muting operation despite excluding these resource elements when performing rate matching.

Figure 10:
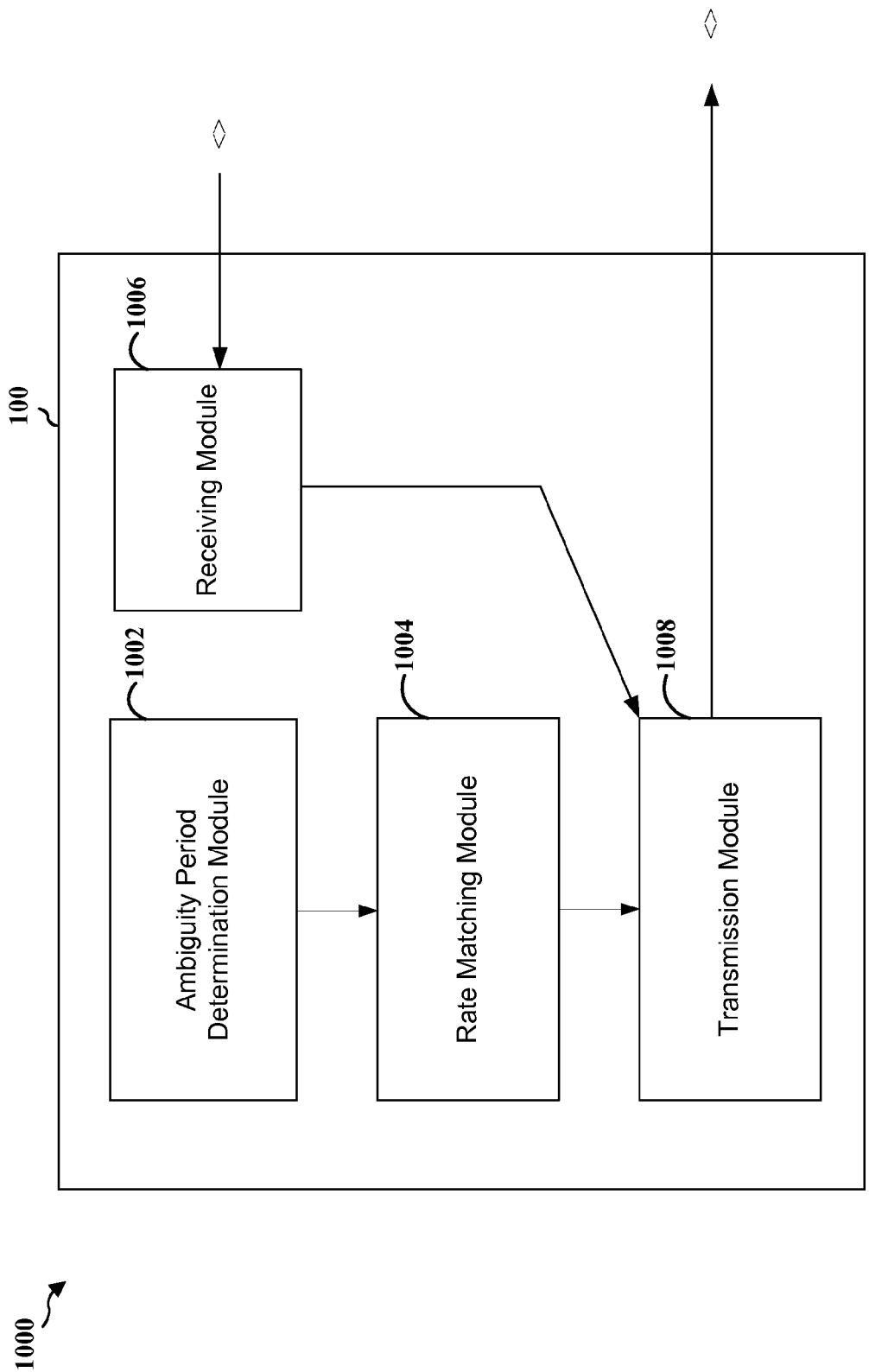
FIG. 10 is a diagram illustrating an example of data flow, in accordance with certain aspects of the disclosure.

FIG. 10 is a conceptual data flow diagram 1000 illustrating the data flow between different modules/means/components in an exemplary apparatus 1010 capable of performing the operations described herein (and illustrated in FIG. 9). The apparatus 1010 includes a module 1002 for determining, by a base station, a period of ambiguity wherein the base station lacks certainty regarding the capability of a user equipment (UE) to support a configuration of resources reserved for a special purpose and a module 1004 for excluding the resources reserved for a special purpose when performing rate matching when transmitting a physical downlink shared channel (PDSCH) to the UE in the resource block during the period of ambiguity. The apparatus 1010 may also include a transmission module 1008 and a receiving module 1006.

The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
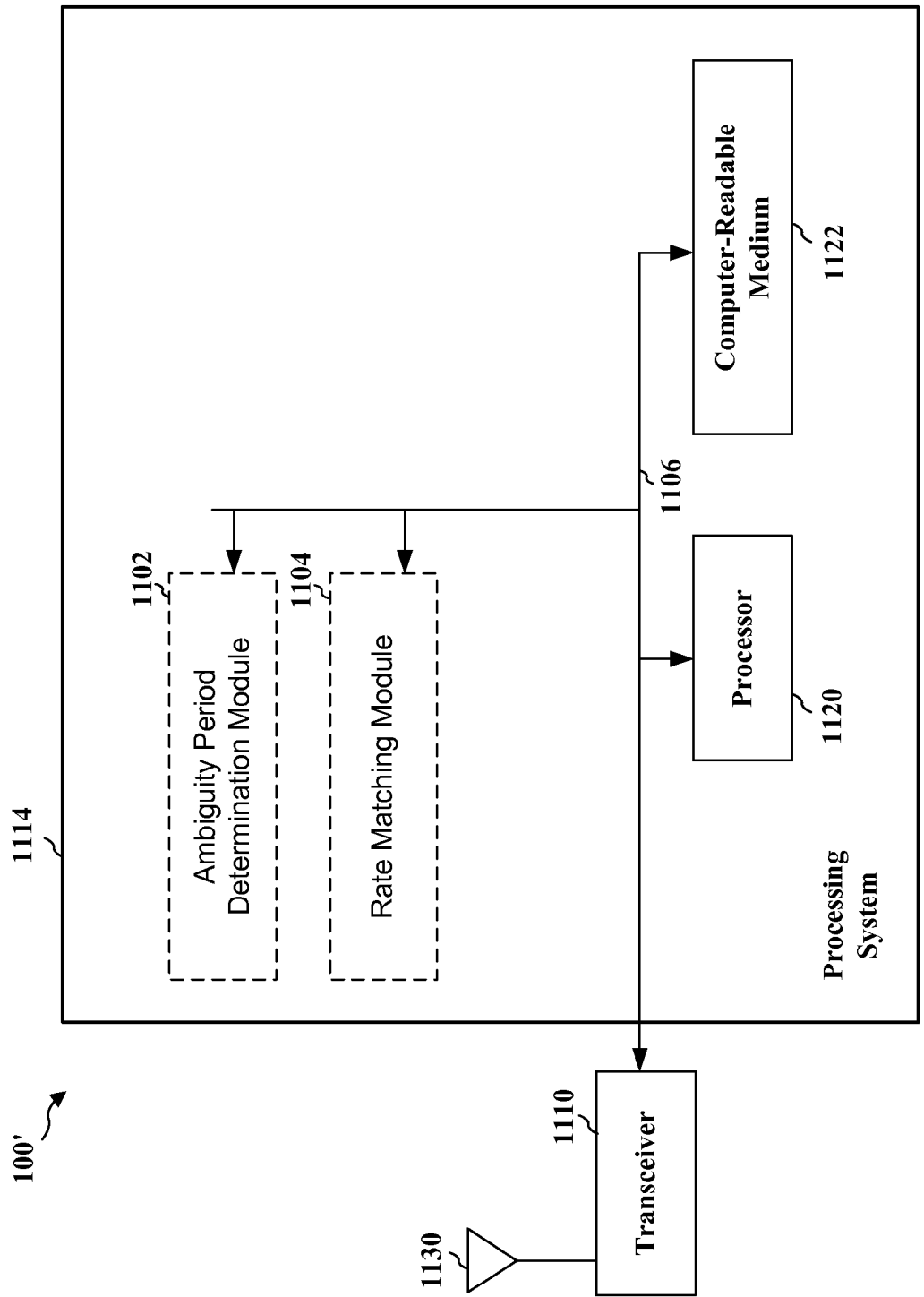
FIG. 11 is a diagram illustrating an example of a hardware implementation for an apparatus employing a processing system in accordance with certain aspects of the disclosure.

FIG. 11 is a diagram illustrating an example of a hardware implementation for an apparatus 1110 employing a processing system 1114. The processing system 1114 may be implemented with a bus architecture, represented generally by the bus 1106. The bus 1106 may include any number of interconnecting buses and bridges depending on the specific application of the processing system 1114 and the overall design constraints. The bus 1106 links together various circuits including one or more processors and/or hardware modules, represented by the processor 1120, the modules 1102, 1104 and the computer-readable medium 1122. The bus 1106 may also link various other circuits such as timing sources, peripherals, voltage regulators, and power management circuits, which are well known in the art, and therefore, will not be described any further.

The processing system 1114 is coupled to a transceiver 1130. The transceiver 1130 is coupled to one or more antennas 1132. The transceiver 1130 provides a means for communicating with various other apparatus over a transmission medium. The processing system 1114 includes a processor 1120 coupled to a computer-readable medium 1122. The processor 1120 may also be responsible for general processing, including the execution of software stored on the computer-readable medium 1122. The software (e.g., instructions), when executed by the processor 1120, causes the processing system 1114 to perform the various functions described supra for any particular apparatus. The computer-readable medium 1122 may also be used for storing data that is manipulated by the processor 1120 when executing software. The processing system further includes modules 1102 and 1104. The modules may be software modules running in the processor 1120, resident/stored in the computer readable medium 1122, one or more hardware modules coupled to the processor 1120, or some combination thereof. The processing system 1114 may be a component of the UE 650 and may include the memory 660 and/or at least one of the TX processor 668, the RX processor 656, and the controller/processor 659 shown in FIG. 6.

In one configuration, an apparatus for wireless communication includes means for performing each of the operations shown in FIG. 9. The aforementioned means may be one or more of the aforementioned modules of the apparatus 1010 and/or the processing system 1114 of the apparatus 1110 configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A wireless communication method, comprising:
   determining, by a base station, a period of ambiguity in which the base station lacks certainty regarding a capability of a user equipment (UE) to support a configuration of resources reserved for a special purpose in a subframe; and
   excluding the resources reserved for a special purpose when performing rate matching when transmitting a physical downlink shared channel (PDSCH) to the UE in the subframe during the period of ambiguity, wherein the period of ambiguity comprises a period during which the base station lacks information regarding a release version of a standard the UE supports.

2. The method of claim 1, wherein the excluding is performed after signaling the configuration of resources reserved for a special purpose.

3. The method of claim 1, wherein the period of ambiguity comprises a period during which the UE is attempting to access the base station but prior to the UE transmitting the information regarding a release version of a standard the UE supports.

4. The method of claim 1, wherein the configuration identifies resource elements reserved for reference signals used to take measurements for channel feedback.

5. The method of claim 1, wherein the configuration identifies resource elements reserved for a PDSCH muting operation.

6. The method of claim 5, further comprising:
   performing muting on the resource elements reserved for a PDSCH muting operation despite excluding the resource elements when performing rate matching.

7. The method of claim 1, wherein the period of ambiguity follows a re-configuration of resources of the subframe to be used for a special purpose.

8. The method of claim 7, wherein the excluding comprises excluding only if one or more conditions are met during the period of ambiguity.

9. A wireless communication method, comprising:
   determining, by a base station, a period of ambiguity in which the base station lacks certainty regarding a capability of a user equipment (UE) to support a configuration of resources reserved for a special purpose in a subframe; and excluding the resources reserved for a special purpose when performing rate matching when transmitting a physical downlink shared channel (PDSCH) to the UE in the subframe during the period of ambiguity, wherein the period of ambiguity follows a re-configuration of resources of the subframe to be used for a special purpose, wherein the excluding comprises excluding only if one or more conditions are met during the period of ambiguity, and wherein whether the one or more conditions is met is dependent on a format of downlink control information (DCI) used to schedule the PDSCH.

10. The method of claim 9, wherein whether the one or more conditions is met is dependent on whether or not DCI format 1A is used to schedule the PDSCH.

11. The method of claim 10, wherein whether the one or more conditions is met is dependent on whether the PDSCH is sent in a common or UE-specific search space.

12. The method of claim 10, wherein whether the one or more conditions is met is dependent on whether the PDSCH is sent in a common search space that overlaps a UE-specific search space.

13. A wireless communication method, comprising:
determining, by a user equipment (UE), a period of ambiguity in which a base station lacks certainty regarding a capability of the UE to support a configuration of resources reserved for a special purpose in a subframe; and processing the subframe with an assumption that the base station has excluded the resources reserved for a special purpose when performing rate matching when transmitting a physical downlink shared channel (PDSCH) to the UE in the subframe during the period of ambiguity, wherein the period of ambiguity comprises a period during which the base station lacks information regarding a release version of a standard the UE supports.

14. The method of claim 13, wherein the period of ambiguity comprises a period during which the UE is attempting to access the base station but prior to the UE transmitting the information regarding a release version of a standard the UE supports.

15. The method of claim 13, wherein the configuration identifies resource elements reserved for reference signals used to take measurements for channel feedback.

16. The method of claim 13, wherein the configuration identifies resource elements reserved for a PDSCH muting operation.

17. The method of claim 13, wherein the period of ambiguity follows a re-configuration of resources of the subframe to be used for a special purpose.

18. A wireless communication method, comprising:
determining, by a user equipment (UE), a period of ambiguity in which a base station lacks certainty regarding a capability of the UE to support a configuration of resources reserved for a special purpose in a subframe; and processing the subframe with an assumption that the base station has excluded the resources reserved for a special purpose when performing rate matching when transmitting a physical downlink shared channel (PDSCH) to the UE in the subframe during the period of ambiguity, wherein the period of ambiguity follows a re-configuration of resources of the subframe to be used for a special purpose, and wherein whether or not it is assumed excluding is performed is dependent on a format of downlink control information (DCI) used to schedule the PDSCH.

19. The method of claim 18, wherein whether or not it is assumed excluding is performed is dependent on whether or not DCI format 1A is used to schedule the PDSCH.

20. The method of claim 18, wherein whether or not it is assumed excluding is performed is dependent on whether the PDSCH is sent in a common or UE-specific search space.

21. The method of claim 18, wherein whether or not the excluding is performed is dependent on whether the PDSCH is sent in a common search space that overlaps a UE-specific search space.

22. An apparatus for wireless communication by a base station, comprising:
means for determining a period of ambiguity in which the base station lacks certainty regarding a capability of a user equipment (UE) to support a configuration of resources reserved for a special purpose in a subframe; and means for excluding the resources reserved for a special purpose when performing rate matching when transmitting a physical downlink shared channel (PDSCH) to the UE in the subframe during the period of ambiguity, wherein the period of ambiguity comprises a period during which the UE is attempting to access the base station but prior to the UE transmitting a message information regarding a release version of a standard the UE supports.

23. The apparatus of claim 22, wherein the configuration identifies resource elements reserved for reference signals used to take measurements for channel feedback.

24. The apparatus of claim 22, wherein the configuration identifies resource elements reserved for a PDSCH muting operation.

25. The apparatus of claim 22, wherein the period of ambiguity follows a re-configuration of resources of the subframe to be used for a special purpose.

26. The apparatus of claim 25, wherein the means for excluding comprises means for excluding only if one or more conditions are met during the period of ambiguity.

27. An apparatus for wireless communication by a base station, comprising:
means for determining a period of ambiguity in which the base station lacks certainty regarding a capability of a user equipment (UE) to support a configuration of resources reserved for a special purpose in a subframe; and means for excluding the resources reserved for a special purpose when performing rate matching when transmitting a physical downlink shared channel (PDSCH) to the UE in the subframe during the period of ambiguity, wherein the period of ambiguity follows a re-configuration of resources of the subframe to be used for a special purpose, wherein the means for excluding comprises means for excluding only if one or more conditions are met during the period of ambiguity and wherein whether the one or more conditions are met is dependent on a format of downlink control information (DCI) used to schedule the PDSCH.

28. An apparatus for wireless communication by a user equipment, comprising:
means for determining a period of ambiguity in which a base station lacks certainty regarding a capability of the UE to support a configuration of resources reserved for a special purpose in a subframe; and means for processing the subframe with an assumption that the base station has excluded the resources reserved for a special purpose when performing rate matching when transmitting a physical downlink shared channel (PDSCH) to the UE in the subframe during the period of ambiguity, wherein the period of ambiguity comprises a period during which the UE is attempting to access the base station but prior to the UE transmitting a message information regarding a release version of a standard the UE supports.

29. The apparatus of claim 28, wherein the configuration identifies resource elements reserved for reference signals used to take measurements for channel feedback.

30. The apparatus of claim 28, wherein the configuration identifies resource elements reserved for a PDSCH muting operation.

31. The apparatus of claim 28, wherein the period of ambiguity follows a re-configuration of resources of the subframe to be used for a special purpose.

32. The apparatus of claim 31, wherein the means for processing is configured to assume excluding only if one or more conditions are met during the period of ambiguity.

33. An apparatus for wireless communication by a user equipment, comprising:
    means for determining a period of ambiguity in which a base station lacks certainty regarding a capability of the UE to support a configuration of resources reserved for a special purpose in a subframe; and
    means for processing the subframe with an assumption that the base station has excluded the resources reserved for a special purpose when performing rate matching when transmitting a physical downlink shared channel (PDSCH) to the UE in the subframe during the period of ambiguity, wherein the period of ambiguity follows a re-configuration of resources of the subframe to be used for a special purpose, wherein the means for processing is configured to assume excluding only if one or more conditions are met during the period of ambiguity and wherein whether the one or more conditions are met is dependent on a format of downlink control information (DCI) used to schedule the PDSCH.

34. An apparatus for wireless communication by a base station, comprising:
    at least one processor configured to determine a period of ambiguity in which the base station lacks certainty regarding a capability of a user equipment (UE) to support a configuration of resources reserved for a special purpose in a subframe and exclude the resources reserved for a special purpose when performing rate matching when transmitting a physical downlink shared channel (PDSCH) to the UE in the subframe during the period of ambiguity, wherein the period of ambiguity comprises a period during which the base station lacks information regarding a release version of a standard the UE supports; and
    a memory coupled with the at least one processor.

35. An apparatus for wireless communication by a user equipment (UE), comprising:
    at least one processor configured to determining a period of ambiguity in which the base station lacks certainty regarding a capability of the UE to support a configuration of resources reserved for a special purpose in a subframe and process the subframe with an assumption that the base station has excluded the resources reserved for a special purpose when performing rate matching when transmitting a physical downlink shared channel (PDSCH) to the UE in the subframe during the period of ambiguity, wherein the period of ambiguity comprises a period during which the base station lacks information regarding a release version of a standard the UE supports; and
    a memory coupled with the at least one processor.

36. A computer program product comprising a non-transitory computer-readable medium having instructions stored thereon, the instructions executable by one or more processors for:
    determining, by a base station, a period of ambiguity in which the base station lacks certainty regarding a capability of a user equipment (UE) to support a configuration of resources reserved for a special purpose in a subframe; and
    excluding the resources reserved for a special purpose when performing rate matching when transmitting a physical downlink shared channel (PDSCH) to the UE in the subframe during the period of ambiguity, wherein the period of ambiguity comprises a period during which the base station lacks information regarding a release version of a standard the UE supports.

37. A computer program product comprising a non-transitory computer-readable medium having instructions stored thereon, the instructions executable by one or more processors for:
    determining, by a user equipment (UE), a period of ambiguity in which a base station lacks certainty regarding a capability of the UE to support a configuration of resources reserved for a special purpose in a subframe; and
    processing the subframe with an assumption that the base station has excluded the resources reserved for a special purpose when performing rate matching when transmitting a physical downlink shared channel (PDSCH) to the UE in the subframe during the period of ambiguity, wherein the period of ambiguity comprises a period during which the base station lacks information regarding a release version of a standard the UE supports.

* * * * *